# 3,101,318
METHOD AND COMPOSITION FOR REMOVING DETERGENTS AND OTHER CONTAMINANTS FROM LAUNDRY WASTES

Herbert M. Watson and Samuel B. Moseman, both of 2311 N. Front St., Harrisburg, Pa.
No Drawing. Filed Apr. 10, 1961, Ser. No. 101,637
15 Claims. (Cl. 210—59)

This invention relates to the removal of materials from water and more particularly to a method and composition for removing detergents and other contaminants from laundry wastes.

The removal of contaminants, especially synthetic detergents, from laundry wastes is a particular problem in areas of high population density where water supplies are often drawn from the same streams in which wastes are dumped or from wells which are supplied by such streams. Ordinary water purification plants, while most efficient in removing harmful organisms such as viruses, bacteria, etc., as well as many industrial poisons, do not completely remove synthetic detergents. Such detergents are extremely undesirable in drinking water because their high surface activity may cause unsightly foaming when the water is drawn at a tap. Moreover, they impart undesirable flavors to foods and their surface activity imparts a laxative effect to food and drink containing them.

It has previously been known to separate contaminants, including soaps and detergents, from water by means of floculation or normal settling processes. These processes have the disadvantage of principally removing only those detergents which might be adsorbed by the floculating agents.

It has also been proposed to use filtration or combined filtration-settling processes employing a filter which has been chemically treated so as to entrap or otherwise remove some of the dissolved contaminants. For example, various sulfates, especially aluminum sulfate, activated or bone carbon and diatomaceous earth have all been proposed to be used either singly or in various combinations. In most instances, however, these systems have the multiple disadvantages of permitting common household anionic detergents to flow through the filter and of being clogged after a short time by the slime which forms on the filter surface.

A primary object of this invention is to provide a filtration method for purifying laundry waste water wherein both suspended and dissolved contaminants are substantially completely removed.

Another object is to provide a filter cake for use in laundry waste water purification which exerts a chemical purification effect on the contaminated water concomitant with the mechanical filtration effect.

A further object of the invention is to provide a method of removing synthetic detergents, particularly those of the anionic type, from laundry effluents and other aqueous solutions containing them.

Still another object is to provide a method of purifying water containing both suspended contaminant particles and dissolved bleach, soap, detergent, etc., by a combined filtration-chemical reaction process which is inexpensive, efficient and speedy.

A further object of the invention is to provide a novel filter cake consisting essentially of a unique combination of carbon, diatomite, aluminum sulfate and sulfamic acid.

Other and further objects will become apparent from the following detailed description.

The objects of this invention are accomplished by filtering contaminated water, especially laundry waste water, with the aid of a filter cake essentially comprising diatomite (diatomaceous earth), carbon, aluminum sulfate and sulfamic acid. The relative amounts of ingredients in this filter cake do not appear to be critical, though we have found that a mixture of from about 40 to 75% diatomite, about 15 to about 50% carbon, about 5 to about 25% aluminum sulfate and about 5 to about 25% dry sulfamic acid is very effective.

In practice, the filter element is first pre-coated by standard technique with approximately 0.1#/sq. ft. of diatomite. The novel filter cake composition of the instant invention is then formed as a slurry in water and this slurry is poured into the filter before the addition of the waste water until .2#/sq. ft. of filter area has been added. The waste water containing detergents is then passed through the filter and as the process is continued a constant addition of the slurry composition is made to the filter cake. In this manner, the filter cake components intermix so as to produce the remarkable water purification effects we have observed. In operation, there is generally a time lag before the carbon is activated to its full adsorptive capacity. This time lag may be from 2 to 20 minutes after which the reduction in detergent amounts will be in excess of 90%.

We do not wish to be bound by any particular theory as to the manner in which the filter cake components interact. We have observed that some of the components exert individual effects upon the water contaminants as well as the group effect which appears to occur. Thus, diatomite adsorbs dirt, lint and other suspended foreign matter and so performs its conventional role. Aluminum sulfate exerts a coagulating effect on soaps and certain other detergent additives which may be present. Sulfamic acid reacts with alkali metal carbonates to form carbon dioxide. With hypochlorites or other chlorine-containing laundry bleaches the sulfamic acid also reacts to evolve nitrogen gas and release sulfuric acid which is adsorbed by carbon. If sulfamic acid is omitted from the filter cake, it rapidly develops a slimy, impermeable surface which would seem to indicate that both sulfamic acid itself and the gases formed when it reacts with carbonates and chlorine bleaches are influential in maintaining the permeability of the filter.

Individual component action alone, however, does not explain the superior efficaciousness of our filter cake. For example, aluminum sulfate is only one of a number of known coagulants for soap, yet it is the only one with which we were able to obtain our unique water purification. Substitution of other coagulants in our filter cake resulted in very little, if any detergent removal. Moreover, although the ionic type detergents, particularly anionic, are adsorbed on the carbon, it is notable that this adsorption does not take place to any appreciable extent if either aluminum sulfate or sulfamic acid is omitted from the filter cake. It thus appears that these two substances enhance the adsorptiveness of the carbon, perhaps through some ion exchange type reaction, though this is purely hypothetical.

The diatomite used may be any commercial variety such as "Celite," manufactured by the Johns-Manville Co. Its pore size is not critical, it being necessary only that the pores be small enough to entrap the dirt and other suspended foreign particles in the waste water.

The carbon may be any finely divided highly adsorptive type. Both activated carbon and bone carbon are especially suitable, but any other porous carbon can be employed.

Technical grades of aluminum sulfate and sulfamic acid perform very well in the purification. It is, of course, possible to use special, highly purified, grades of these chemicals but no particular advantage accrues from doing so and the technical grades are advantageous from a cost viewpoint. Sulfamic acid is preferably added as a dry material and not as a solution, though this, again, does not appear to be critical.

The filter cake of this invention removes dirt and other suspended particles, soaps, laundry bleaches, soap and detergent additives and synthetic detergents themselves from water containing them. Among the detergents most effectively removed are the alkali metal alkyl sulfates—as, e.g. sodium lauryl sulfate, sodium oleyl sulfate, sodium palmityl sulfate, etc.; the alkali metal alkylbenzenesulfonates such as sodium dodecylbenzenesulfonate, potassium tridecylbenzenesulfonate, sodium hexadecylbenzene sulfonate, etc.; the alkali metals salts of alkylbenzenecarboxylic acids such as sodium tridecylbenzoate; the alkylamine and alkanolamine salts corresponding to the alkali metal salts named above—e.g., ethanolamine lauryl sulfate, etc. The filter cake further removes the various polyphosphate, phosphate, pyrophosphate hypophosphite, etc. compounds commonly used as detergent additives, as well as the soluble silicates, etc. which are commonly present. It is effective in removing dissolved carbonates, hypochlorites and other chlorinated bleaches, perborate and peroxide bleaches commonly used in laundry products, etc.

It is, of course, obvious that any water containing these contaminants can be purified by our method, laundry waste water being the most common example.

The filter cake may be employed in conjunction with any conventional filtration apparatus, whether of the vacuum (suction) type or of the pressure type. Preferably, a settling tank is used to allow as much suspended foreign matter as possible to be removed prior to filtration and thus prolong the life of the filter cake. This is not necessary, however. The filtration chamber may be constructed of any substantially water-tight material, such as steel, concrete, plastic, aluminum, etc.

The filter cell may contain any number of filter elements, depending on the volume of water to be treated. These filter elements are fashioned of stainless steel, plastic, septum cores or any other suitable material. They are covered with woven textile fibers, paper, saran cloth, polyethylene or any other material porous to water but impervious to diatomite particles.

The filter cake is usable for prolonged periods in comparison to filter cakes of the prior art. However, when its adsorptiveness deteriorates (as may be readily determined by the detergent content of filtrate), it may easily be disposed of; in fact, one of its advantages is that it can be incinerated rather than sent to a sewage system.

Having generally described our invention, the following examples are given by way of specific illustration:

EXAMPLE 1

Using a conventional suction-type filtration system with a settling tank ahead of the filter cell, clean water was circulated through the cell and diatomite in the amount of 0.1 lb. per sq. ft. of filter area was added. After the initial pre-coat of diatomite, an additional pre-coat composed of a slurry of 8 parts of diatomite, 4 parts of activated carbon, 2 parts of technical aluminum sulfate and 2 parts of technical sulfamic acid (dry basis) and water was added to the filter cake. A sample of sodium lauryl sulfate-contaminated laundry water having a turbidity analysis of 94 p.p.m. and a detergent content of 32 p.p.m. was filtered through the system for 25 minutes, during which time, a slurry of the sulfamic acid composition was constantly applied to maintain uniform adsorption of the detergent contaminated water; the rate of such additives being .01#/ft.²/hr. After a time lag of two minutes, the effluent had a constant turbidity analysis of 1 p.p.m. and a detergent content of 3 p.p.m. during the remainder of the test and there was no build up in vacuum or presusre. Upon completion of this test the filter media was soft, permeable, slightly effervescent and there was no indication of metallic sulfate precipitation or sliming.

EXAMPLE 2

Following the method of Example 1, a second sample of sodium lauryl sulfate-containing water was treated. Initially it had a detergent analysis of 30 p.p.m. and a turbidity of 304 p.p.m. After treatment, the detergent content was constantly reduced to 2.3 p.p.m. and the turbidity to 3 p.p.m. The final appearance of the filter media was the same as in Example 1.

EXAMPLE 3

Example 1 was again repeated using a sample containing 14 p.p.m. sodium lauryl sulfate detergent and having a turbidity of 116 p.p.m. The treated filtrate constantly analyzed 2.0 p.p.m. detergent and 1 p.p.m. turbidity and the filter media appeared similar to that of the above examples.

In order to compare the effects of filter aid compositions without sulfamic acid on aluminum sulfate the following experiments were conducted:

EXAMPLE 4

*Effect of Omission of Sulfamic Acid*

A test was conducted in the same manner as Example 1 except that sulfamic acid was omitted from the filter media. Immediately upon introduction of the detergent composition there was evidence of coagulation of aluminum sulfate apparently resulting from the sodium hypochlorite and other bleaching agents in the laundry waste water. The filter cake was rendered impermeable due to detergent floc and a pressure (vacuum) build up was evident after 5 minutes' operation. There was little detergent reduction noted and the filter was shut off after only 10 minutes' operation. The cake at shut down appeared extremely slimy.

EXAMPLE 5

A further test was conducted utilizing the same procedure as Example 4 except that there was no bleach additive to the laundry waste. Although the operation was somewhat improved from a filter appearance standpoint, there was little detergent removal.

EXAMPLE 6

*Effect of Coagulants Other Than Aluminum Sulfate*

A test was conducted in the same manner as Example 1 except that iron sulfate replaced the aluminum sulfate in the sulfamic acid slurry. Immediately upon introduction of the waste water containing detergents and their bleaching agents the iron precipitated causing a floc which shut down the filter.

Similar effects were noted in tests where ferric chloride, ferric sulfate, copper sulfate, or "Separan" was substituted for aluminum sulfate.

When the bleaching agents were excluded from the laundry wastes, these flocculating agents acted in a similar manner as aluminum sulfate.

It will be understood that the foregoing description is intended to be illustrative only. Many modifications and variations will occur to one skilled in the art, and these are intended to be included, limited only by the appended claims.

What is claimed is:

1. A composition for removal of detergent from laundry wastes from water consisting essentially of about 15 to 50% carbon, about 5 to 25% aluminum sulfate, about 5 to 25% sulfamic acid, and from about 40 to 75% diatomite.

2. A slurry adapted to be applied to a filter element of a filtration unit consisting essentially of water, about 15 to 50% carbon, about 5 to 25% aluminum sulfate, about 5 to 25% sulfamic acid, and from 40 to 75% diatomite.

3. A slurry for application to the filter cells of a filtration apparatus, consisting essentially of water, about 8 parts diatomite, 4 parts carbon, 2 parts aluminum sulfate and 2 parts sulfamic acid.

4. A slurry according to claim 3 wherein the carbon is activated carbon.

5. A slurry according to claim 3 wherein the carbon is bone carbon.

6. A method of filtering and purifying laundry wastes containing detergents comprising pre-coating the filter elements of a filtration apparatus with diatomite; further precoating the filter elements with a composition consisting essentially of about 15–50% carbon, about 5–25% aluminum sulphate, about 5–25% sulfamic acid and from 40–75% diatomite; and filtering the laundry wastes through the pre-coats.

7. A method according to claim 6 wherein the filtration apparatus is of the vacuum type.

8. A method according to claim 6 wherein the filtration apparatus is of the pressure type.

9. A method according to claim 6 wherein the diatomite pre-coat is about .1#/ft.² of filter area.

10. A method according to claim 6 wherein the sulfamic acid containing pre-coat is about .2#/ft.² of filter area.

11. A method according to claim 6 wherein, during the filtration of the laundry wastes the pre-coating composition containing sulfamic acid is constantly added to the filter elements in sufficient amount to maintain the removal of detergents.

12. A method according to claim 6 wherein the pre-coat ingredients are applied to the filter elements by incorporation thereof into sufficient water to form a slurry.

13. A method of filtering and purifying laundry wastes containing anionic detergents comprising pre-coating the filter elements of a filtration apparatus with about .1#/ft.² of filter area with diatomite; further precoating the filter elements with .2#/ft.² of filter area of a composition, applied in water slurry form consisting essentially of about 8 parts diatomite, 4 parts carbon, 2 parts aluminum sulfate and 2 parts sulfamic acid; filtering the laundry wastes through the precoats; and constantly adding pre-coating compositions of the type containing sulfamic acid to the filter elements during the filtering of the laundry wastes in sufficient amounts to maintain the constant removal of detergents.

14. A method of filtering and purifying laundry wastes containing detergents comprising pre-coating the filter elements of a filtration apparatus with a composition consisting essentially of about 15–50% carbon, about 5–25% aluminum sulphate, about 5–25% sulfamic acid, and from 40–75% diatomite, and filtering the laundry waste through the pre-coated filter.

15. A method of preparing the filter elements of a filtration apparatus for filtering and purifying laundry wastes containing detergents comprising coating said filter elements with a composition consisting essentially of about 15–50% carbon, about 5–25% aluminum sulphate, about 5–25% sulfamic acid, and about 40–75% diatomite.

References Cited in the file of this patent
UNITED STATES PATENTS

| | | |
|---|---|---|
| 1,993,761 | Tippins | Mar. 12, 1935 |
| 2,450,766 | Nixon et al. | Oct. 5, 1948 |
| 2,468,189 | Frankenhoff | Apr. 26, 1949 |
| 2,555,970 | Hudson | June 5, 1951 |